United States Patent
Kang et al.

(10) Patent No.: US 8,874,137 B2
(45) Date of Patent: Oct. 28, 2014

(54) METHOD AND DEVICE FOR DISCRIMINATING POSITIONING ERROR USING WIRELESS LAN SIGNAL

(75) Inventors: Suk Yon Kang, Seoul (KR); Chae Hwan Cho, Gyeonggi-do (KR); Seung Yoon Baek, Seoul (KR); Hye Min Lee, Gyeonggi-Do (KR); Chang Seok Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 132 days.

(21) Appl. No.: 13/808,825

(22) PCT Filed: Jun. 28, 2011

(86) PCT No.: PCT/KR2011/004699
§ 371 (c)(1),
(2), (4) Date: Mar. 22, 2013

(87) PCT Pub. No.: WO2012/005466
PCT Pub. Date: Jan. 12, 2012

(65) Prior Publication Data
US 2013/0170484 A1 Jul. 4, 2013

(30) Foreign Application Priority Data
Jul. 8, 2010 (KR) .................. 10-2010-0065807

(51) Int. Cl.
*H04W 24/00* (2009.01)
*H04W 64/00* (2009.01)
*G01S 5/02* (2010.01)

(52) U.S. Cl.
CPC .............. *H04W 24/00* (2013.01); *H04W 64/00* (2013.01); *G01S 5/0252* (2013.01); *G01S 5/0268* (2013.01); *G01S 5/021* (2013.01)
USPC ................... 455/456.1; 342/357.3; 342/357.2

(58) Field of Classification Search
CPC ... H04W 64/00; H04W 4/025; H04W 64/003; H04W 84/12
USPC ........... 455/456.1–456.5, 41.2; 370/252, 328; 342/357.31–357.48
See application file for complete search history.

(56) References Cited

U.S. PATENT DOCUMENTS

| 2001/0022558 A1* | 9/2001 | Karr et al. ...................... 342/450 |
| 2008/0008117 A1* | 1/2008 | Alizadeh-Shabdiz ........ 370/328 |

(Continued)

FOREIGN PATENT DOCUMENTS

| KR | 10-2007-0068019 | 6/2007 |
| KR | 10-0896680 | 10/2008 |
| KR | 10-0928049 | 4/2009 |

OTHER PUBLICATIONS

International Search Report mailed Feb. 24, 2012 for PCT/KR2011/004699, citing the above references.

*Primary Examiner* — Nathan Taylor
(74) *Attorney, Agent, or Firm* — Lowe Hauptman & Ham, LLP (57) ABSTRACT

Apparatus for determining a positioning error includes: database for storing grid cells separated by each pCell ID and WLAN environment information matched to grid cells; information receiving unit for receiving terminal WLAN environment information from mobile communication terminal; identification information checking unit for checking AP identification information included in terminal WLAN environment information; triangulating unit for calculating triangulation coordinate value by performing triangulation with AP position estimation information corresponding to AP identification information; grid cell positioning unit for selecting one or more grid cells corresponding to AP identification information and calculating grid cell coordinate value based on coordinate value corresponding to grid cell selected; and error determining unit for comparing triangulation coordinate value and grid cell coordinate value and determining whether there is positioning error in any one of triangulation coordinate value and grid cell coordinate value.

16 Claims, 6 Drawing Sheets

(56) References Cited

U.S. PATENT DOCUMENTS

| | | |
|---|---|---|
| 2008/0108371 A1* | 5/2008 | Alizadeh-Shabdiz et al. .................. 455/456.1 |
| 2009/0303112 A1* | 12/2009 | Alizadeh-Shabdiz ... 342/357.01 |
| 2010/0273418 A1* | 10/2010 | Eruchimovitch et al. .... 455/41.2 |
| 2011/0074626 A1* | 3/2011 | Alizadeh-Shabdiz et al. ........................ 342/357.31 |
| 2011/0080841 A1* | 4/2011 | Alizadeh-Shabdiz et al. .............................. 370/252 |
| 2011/0176494 A1* | 7/2011 | Huang et al. ................... 370/329 |
| 2011/0176523 A1* | 7/2011 | Huang et al. ................... 370/338 |
| 2011/0177831 A1* | 7/2011 | Huang ........................... 455/457 |
| 2011/0250903 A1* | 10/2011 | Huang et al. ................ 455/456.1 |
| 2011/0287783 A1* | 11/2011 | Alizadeh-Shabdiz et al. .......................... 455/456.1 |
| 2013/0143593 A1* | 6/2013 | Wirola et al. ............... 455/456.1 |
| 2013/0165142 A1* | 6/2013 | Huang ....................... 455/456.1 |
| 2013/0196686 A1* | 8/2013 | Huang et al. ............... 455/456.1 |
| 2013/0231132 A1* | 9/2013 | Huang et al. ............... 455/456.1 |

\* cited by examiner

METHOD AND DEVICE FOR DISCRIMINATING POSITIONING ERROR USING WIRELESS LAN SIGNAL

TECHNICAL FIELD

The present disclosure relates in some aspects to a method and apparatus for determining a positioning error by using a wireless local area network (WLAN) signal. More particularly, the present disclosure relates to a method and apparatus for determining a positioning error by using a WLAN signal, which receive WLAN environment information through a terminal and determines a positioning error by comparing a triangulation coordinate value based on AP position estimation information checked by AP identification information included in the WLAN environment information received and a grid cell coordinate value based on a coordinate value corresponding to a grid cell corresponding to the AP identification information.

BACKGROUND

The statements in this section merely provide background information related to the present disclosure and may not constitute prior art.

With the rapid development of computer, electronic and communication technologies, a variety of wireless communication services based on wireless networks have been provided. Accordingly, services provided by mobile communication systems based on wireless communication networks have evolved from voice services to multimedia services that involve transmission of various data such as circuit data and packet data.

Among a variety of wireless Internet services using mobile communication terminals, a location based service (LBS) has attracted much attention due to the wide application and convenience thereof. LBS is a communication service that determines a location of a mobile communication terminal, such as a portable phone and a personal digital assistant (PDA), and provides additional information related to the determined location. Positioning technologies for providing the LBS may be classified into a network based positioning technology, a handset based positioning technology, and a hybrid positioning technology. Specifically, the network based positioning technology detects a location by way of software using a radiowave environment, which is a cell radius of a base station in a mobile communication network, in order to determine a location of a mobile communication terminal. The handset based positioning technology uses a Global Positioning System (GPS) receiver mounted on a mobile communication terminal in order to determine a location of a mobile communication terminal. The hybrid positioning technology is a combination of the network based positioning technology and the handset based positioning technology.

Accordingly, from the viewpoint of an operator for providing a location-based service, there is a need for a technology for determining and managing a positioning error in order to improve a positioning accuracy.

DISCLOSURE

Technical Problem

Therefore, to solve the above-mentioned problems, the present disclosure seeks to provide a method and apparatus for determining a positioning error by using a LAN signal, which can determine a positioning error by comparing a triangulation coordinate value based on AP position estimation information checked by AP identification information received through a terminal and a grid cell coordinate value based on a coordinate value corresponding to a grid cell corresponding to the AP identification information.

SUMMARY

An embodiment of the present disclosure provides an apparatus for determining a positioning error includes: a database for storing grid cells separated by each pCell ID and WLAN environment information matched to the grid cells; an information receiving unit for receiving terminal WLAN environment information from a mobile communication terminal; an identification information checking unit for checking AP identification information included in the terminal WLAN environment information; a triangulating unit for calculating a triangulation coordinate value by performing triangulation with AP position estimation information corresponding to the AP identification information; a grid cell positioning unit for selecting one or more grid cells corresponding to the AP identification information and calculating a grid cell coordinate value based on a coordinate value corresponding to the grid cell selected; and an error determining unit for comparing the triangulation coordinate value and the grid cell coordinate value and determining whether there is a positioning error in any one of the triangulation coordinate value and the grid cell coordinate value.

Another embodiment of the present disclosure provides an apparatus for determining a positioning error includes: a database for storing grid cells separated by each pCell ID and WLAN environment information matched to the grid cells; an information receiving unit for receiving terminal WLAN environment information and base station environment information from a mobile communication terminal; an identification information checking unit for checking AP identification information included in the terminal WLAN environment information and base station identification information included in the base station environment information; a grid cell positioning unit for selecting a grid cell corresponding to the AP identification information and calculating a grid cell coordinate value based on a coordinate value corresponding to the grid cell selected; a triangulating unit for selecting a base station grid cell corresponding to the base station identification information and calculating a base station-based triangulation coordinate value by performing triangulation a coordinate value corresponding to the base station grid cell; and an error determining unit for comparing the base station-based triangulation coordinate value and the grid cell coordinate value and determining whether there is a positioning error in any one of the base station-based triangulation coordinate value and the grid cell coordinate value.

Yet another embodiment of the present disclosure provides a method for determining a positioning error includes: receiving terminal WLAN environment information from a mobile communication terminal; checking AP identification information included in the terminal WLAN environment information; calculating a triangulation coordinate value by performing triangulation with AP position estimation information corresponding to the AP identification information; selecting one or more grid cells corresponding to the AP identification information and calculating a grid cell coordinate value based on a coordinate value corresponding to the grid cell selected; and comparing the triangulation coordinate value and the grid cell coordinate value and determining whether there is a positioning error in any one of the triangulation coordinate value and the grid cell coordinate value.

Yet another embodiment of the present disclosure provides a method for determining a positioning error includes: receiving terminal WLAN environment information and base station environment information from a mobile communication terminal; checking AP identification information included in the terminal WLAN environment information and base station identification information included in the base station environment information; selecting a grid cell corresponding to the AP identification information and calculating a grid cell coordinate value based on a coordinate value corresponding to the grid cell selected; selecting a base station grid cell corresponding to the base station identification information and calculating a base station-based triangulation coordinate value by performing triangulation a coordinate value corresponding to the base station grid cell; and comparing the base station-based triangulation coordinate value and the grid cell coordinate value and determining whether there is a positioning error in any one of the base station-based triangulation coordinate value and the grid cell coordinate value.

ADVANTAGEOUS EFFECTS

As described above, according to the embodiments of the present disclosure, a positioning error can be determined by receiving WLAN environment information through a terminal and comparing a triangulation coordinate value based on AP position estimation information checked by AP identification information included in the WLAN environment information received and a grid cell coordinate value based on a coordinate value corresponding to a grid cell corresponding to the AP identification information. In addition, according to the embodiments of the present disclosure, a positioning accuracy and a customer satisfaction can be improved by comparison between a triangulation scheme and a pCell scheme. In addition, according to the embodiments of the present disclosure, since a region with an error occurring on database can be easily detected based on cumulative measurement data, the cost and time taken to measure an error by visiting all regions can be reduced.

DESCRIPTION OF REFERENCE NUMERAL

110: Mobile communication terminal
120: Position calculating server
130: WLAN-based positioning server
132: Positioning error determining apparatus
140: Database
210: Information receiving unit
220: ID information checking unit
230: Triangulating unit
240: Grid cell positioning unit
250: Distance difference calculating unit
260: Error determining unit

DETAILED DESCRIPTION

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A pilot cell (hereinafter referred to as "pCell") described in the present disclosure addresses a network-based positioning technology. The network-based positioning technology is a positioning scheme that separates a positioning service target region in units of a grid of a predetermined size, defines each grid as a pCell, constructs a pCell database of the positioning results of the respective pCells, and uses the pCell database to perform positioning. This positioning scheme can provide more accurate positioning results than other positioning schemes.

In addition, the present disclosure will describe only a scheme of determining a positioning error through a positioning error determining apparatus 132, and will proceed without specifying a scheme of removing or interpolating the error by a communication service provider using the positioning error determined through the positioning error determining apparatus 132. However, since the determination of a positioning error is to remove or interpolate the error, the positioning error determined through the positioning error determining apparatus 132 may be transmitted to an operator terminal of a communication service provider and then used by the operator terminal to remove or interpolate the error.

Figure 1:
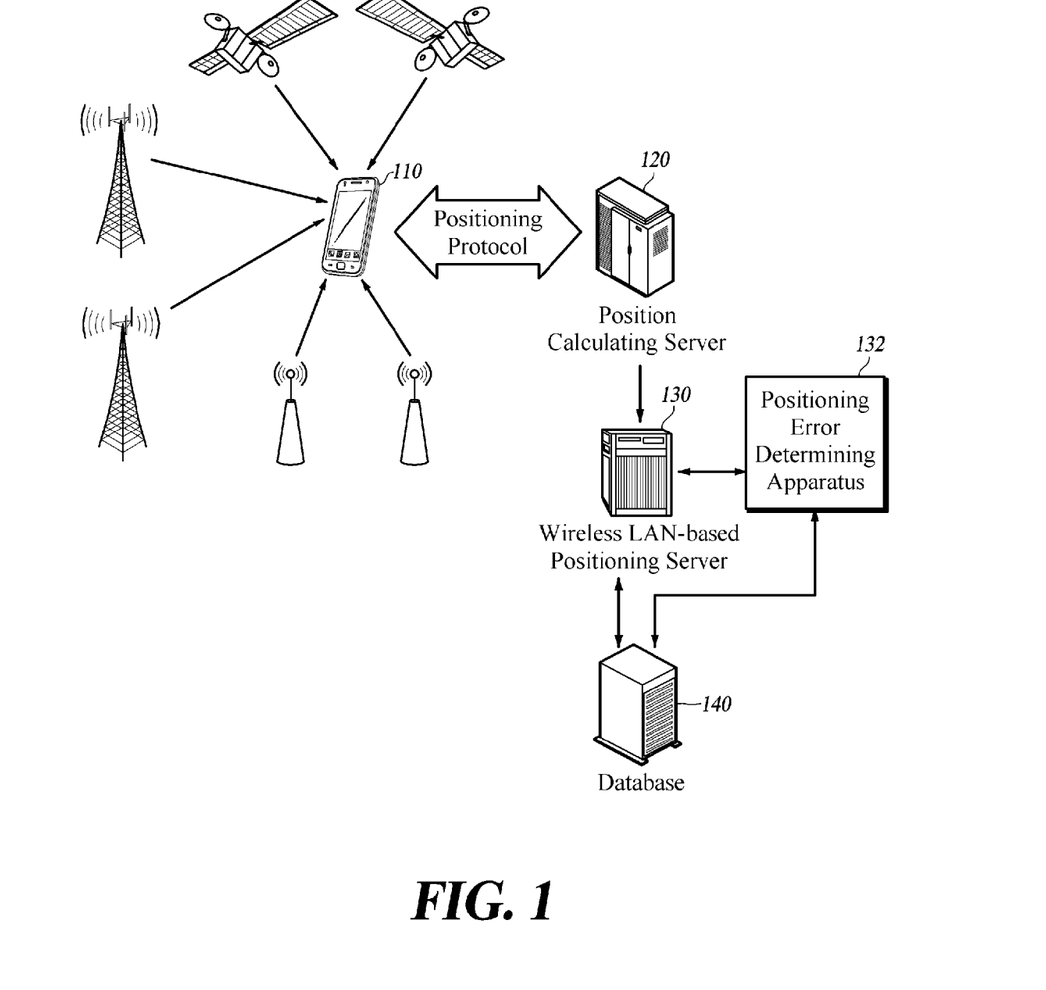
FIG. 1 is a block diagram for illustrating a schematic configuration of a system for determining a positioning error by using a WLAN signal according to one or more embodiments of the present disclosure.

FIG. 1 is a block diagram illustrating a schematic configuration of a system for determining a positioning error by using a WLAN signal according to one or more embodiments of the present disclosure.

A system for determining a positioning error by using a WLAN signal according to one or more embodiments of the present disclosure includes a mobile communication terminal 110, a position calculating server 120, a WLAN-based positioning server 130, a positioning error determining apparatus 132, and a database 140. Although the system for determining a positioning error by using a WLAN signal according to one or more embodiments of the present disclosure specifically lists the components of mobile communication terminal 110, position calculating server 120, WLAN-based positioning server 130, positioning error determining apparatus 132, and database 140, the list merely presents the technical idea of one of different exemplary embodiments and those skilled in the art will appreciate that various modifications, additions and substitutions may be made for the components of the system without departing from the essential characteristics of the present disclosure.

The mobile communication terminal 110 includes a wireless communication module for performing a general voice call and data communication. The mobile communication terminal 110 uses the wireless communication module to perform a general voice call and data communication in conjunction with a mobile network (not illustrated). The mobile communication terminal 110 transmits base station (BS) information of its interworking mobile network to the position calculating server 120.

The mobile communication terminal 110 includes a WLAN module. The mobile communication terminal 110 uses the WLAN module to access the Internet through an adjacent recognizable AP (access point) and receive various webpage data. Herein, the AP is a device that connects data communication, reads a receiver's address from transmitter's information, designates the most suitable communication path, and transmits the same to other networks. Specifically, the AP may extract the position of a data packet, designate an optimal communication path for the extracted position, and transmit the data packet to a next device through the designated communication path, and may share a plurality of circuits in a general network environment. In the present embodiment, the AP may include a router, a repeater, a relay, and a bridge. The mobile communication terminal 110 collects WLAN environment information from a communication AP and transmits the same to the position calculating server 120. Herein, the WLAN environment information includes one or more of a MAC address of an AP relaying a WLAN signal, a received signal strength (RSS) for each MAC address, AP channel information, and AP frequency information.

In addition, the mobile communication terminal 110 includes a global positioning system (GPS) module. The mobile communication terminal 110 extracts navigation data from a GPS radiowave signal received from one or more GPS satellites, and transmits the same to the position calculating server 120 through the mobile network. The mobile communication terminal 110 may be a smart phone, a personal computer (PC), a notebook computer, or a personal digital assistant (PDA) that includes a wireless communication module and a GPS module. The mobile communication terminal 110 includes a memory for storing an application for providing a location based service, and a microprocessor for executing programs to perform operations and controls.

A positioning protocol is a protocol that standardizes an application layer for positioning. The positioning protocol may be any positioning protocol as long as it can communicate a GPS radiowave signal and a WLAN signal between the mobile communication terminal 110 and the position calculating server 120. The positioning protocol may include Interim Standard-801 (IS-801), Radio Resource Location Services Protocol (RRLP), Radio Resource Control (RRC), Secure User Plane Location (SUPL), or the like. SUPL 2.0 may be used as the positioning protocol to transmit/receive both a GPS radiowave signal and a WLAN signal between the mobile communication terminal 110 and the position calculating server 120; however, the present disclosure is not limited thereto. Herein, SUPL is a scheme that sublates communication between network nodes that would otherwise necessary to perform a conventional positioning process, by allowing positioning-related data to be directly communicated between the mobile communication terminal 110 and the position calculating server 120 through a data transmission path. SUPL is a protocol that can reduce the cost of implementing nodes necessary for positioning tracking and can provide more accurate positioning services. With SUPL 2.0, the mobile communication terminal 110 may measure a round trip delay (RTD). Specifically, when using a WLAN signal for communication and setting WLAN parameters, the mobile communication terminal 110 may set a location identifier (ID) and multiple location IDs and measure an RTD including an RTD value, RTD units, and RTD accuracy as WLAN AP information.

The position calculating server 120 receives satellite data through a satellite receiver installed therein, and performs positioning by using satellite data of the mobile communication terminal 110 that requests positioning. Specifically, the position calculating server 120 receives navigation data from the mobile communication terminal 110 and calculates the latitude/longitude coordinates of the mobile communication terminal 10. In addition, the position calculating server 120 transmits aiding data for assisting in determining the position of the mobile communication terminal 110, and calculates a distance between a GPS satellite and the mobile communication terminal 110. In addition, when receiving position information from the mobile communication terminal 110 selectively if necessary, the position calculating server 120 transmits the position information to a location based-service platform (LBSP). The position calculating server 120 may transmit latitude/longitude data that are positioning result data and pilot phase measurement (PPM) data that are received from the mobile communication terminal 110, to a pCell positioning server.

The position calculating server 120 receives a positioning request signal (Location Request) from the LBSP, and transmits a Short Message Request (SMREQ) signal requesting information on a terminal corresponding to a positioning target, to an HLR. The position calculating server 120 receives a short message request (smreq) signal carrying a response to the SMREQ signal requesting information on the positioning target terminal, from the HLR. The position calculating server 120 positions the mobile communication terminal 110 in conjunction with the mobile communication terminal 110 and the WLAN-based positioning server 130 and transmits a positioning response signal (Location Result) including the positioning result to an LBSP.

For the position calculating server 120, a position determination entity (PDE) may be used in a synchronous code division multiple access (CDMA) system, a Position Server (PS) may be used in an asynchronous wideband code division multiple access (W-CDMA) system, and a Serving Mobile Location Center (SMLC) may be used in a Global System for Mobile communication (GSM) system; however, the present disclosure is not limited thereto. In the CDMA system, the PDE may perform satellite-based positioning and network-based positioning by triangulation. In the W-CDMA system, the PS may perform satellite-based positioning and cell-based positioning. In the GSM system, the SMLC may perform satellite-based positioning and cell-based positioning.

The PPM data mentioned above may include time/distance information of an adjacent BS and system information measured by the mobile communication terminal 110. Herein, basic data collected by the mobile communication terminal 110 include information on a serving system, a pilot signal of an adjacent BS, and signal strength. The information on a serving system includes a system ID (SID), a network ID (NID), a base station ID (BSID), a serving BS sector number (reference PN: Ref_PN), a pilot phase in Ref_PN, and a signal strength. The pilot signal of an adjacent BS includes an adjacent BS sector number (measurement PN) collected from the mobile communication terminal 110, a pilot phase in each measurement PN, a signal strength and such distance data and time data. The PPM data are positioning-related data in the CDMA system, and may be UE RX-TX Time Difference data or System Frame Number (SFN)-SFN Observed Time Difference data in the W-CDMA system. However, the present disclosure is not limited thereto, and the PPM data may be positioning-related data used in any other communication systems.

Although the position calculating server 120 is described as being used in the CDMA and W-CDMA to provide pCell positioning, the list merely presents the technical idea of one of different exemplary embodiments and those skilled in the art will appreciate that modifications may be made therein without departing from the essential characteristics of the present disclosure. For example, the position calculating server 120 may be used in WiBro known as mobile Wimax, Long Term Evolution (LTE), and Evolved Packet Core (EPC) to provide pCell positioning.

In addition, the position calculating server 120 may receive WLAN environment information from the mobile communication terminal 110 and calculate WLAN position information according to WLAN environment information by using the WLAN-based positioning server 130. Herein, the WLAN-based positioning server 130 is a separate server that calculates a position of the mobile communication terminal 110 by using WLAN environment information. In addition, the position calculating server 120 may receive BS environment information from the mobile communication terminal 110 and calculate triangulation position information by performing triangulation based on BS identification included in the BS environment information. Specifically, if three or more pieces of BS identification information are included in the BS environment information received from the mobile communication terminal 110, the position calculating server 120 may triangulate the three identifiers of information with a signal strength of a predetermined value or more, calculate a center point of the triangle, and recognize the center point as triangulation position information.

The WLAN-based positioning server 130 positions the mobile communication terminal 110 corresponding to a positioning target by using grid cells separated by each pCell ID stored in the database 140 and WLAN environment information matched to the grid cells. When a positioning request is transmitted from the mobile communication terminal 110 to the position calculating server 120, the WLAN-based positioning server 130 selects a grid cell having the best matching characteristic with PPM data received from the mobile communication terminal 110, in the database 140 and provides the same to a service requester as the final positioning result. Herein, to provide the service requester with more accurate positioning results, the database 140 should be updated to always retain the newest data (e.g., PN, pilot phase, signal strength, MAC address or the like) capable of better reflecting a change in positioning environments such as base station-based environment information at the time of a positioning request, WLAN environment information, and a positioning system state.

The positioning error determining apparatus 132 receives terminal WLAN environment information from the mobile communication terminal 110. The positioning error determining apparatus 132 checks AP identification information included in the terminal WLAN environment information received from the mobile communication terminal 110. Herein, the WLAN environment information includes one or more of a MAC address of an AP for relaying a WLAN signal, a received signal strength (RSS) for each MAC address, AP channel information, and AP frequency information. The AP identification information may be any information for identification of the AP, and may be a MAC address. On the other hand, the positioning error determining apparatus 132 checks BS identification information included in the BS environment information received from the mobile communication terminal 110. Herein, the BS environment information includes a system ID (SID), a network ID (NID), a base station ID (BSID), a serving BS sector number (reference PN: Ref_PN), a pilot phase in Ref_PN, and a signal strength. Here, the BS identification information can identify the relevant BS, and it may be a BS sector number.

The positioning error determining apparatus 132 calculates a triangulation coordinate value by performing triangulation with AP position estimation information corresponding to the AP identification information. Specifically, if there are a plurality of AP identification information pieces, the positioning error determining apparatus 132 may select three pieces of the AP position estimation information as having a signal strength of a predetermined value or more, triangulate the selected positions, calculate a center point of the triangle, and recognize the center point as triangulation position information. The AP position estimation information is what is pre-stored based on position information of WLAN environment information that is collected through one or more of an external server of the mobile communication terminal and a field survey device in configuring the database 140.

The positioning error determining apparatus 132 selects one or more grid cells corresponding to the AP identification information and calculates a grid cell coordinate value based on a coordinate value corresponding to the grid cell selected. The positioning error determining apparatus 132 calculates the grid cell coordinate value by one or more of a triangulation positioning scheme based on the coordinate value corresponding to the grid cell selected, a median calculation scheme, and an average value calculation scheme based on a signal strength. If the grid cells selected are three or more, the positioning error determining apparatus 132 selects three cells having the highest radiowave strength among radiowave strength information included in terminal WLAN environment information, and calculates the grid cell coordinate value by performing triangulation with coordinate values corresponding to the three grid cells. If the grid cells selected are two, the positioning error determining apparatus 132 calculates the grid cell coordinate value with a median of coordinate values corresponding to the two grid cells. If there are plural grid cells selected, the positioning error determining apparatus 132 selects a grid cell with the highest radiowave strength and a grid cell with the lowest radiowave strength among the radiowave strength information included in the terminal WLAN environment information, and calculates the grid cell coordinate value with a median of a coordinate value corresponding to the grid cell with the highest radiowave strength and a coordinate value corresponding to the grid cell with the lowest radiowave strength.

The positioning error determining apparatus 132 compares between the triangulation coordinate value and the grid cell coordinate value to determine whether there is a positioning error in any one of the triangulation coordinate value and the grid cell coordinate value. The positioning error determining apparatus 132 calculates a distance difference value between the triangulation coordinate value and the grid cell coordinate value. If the distance difference value exceeds a threshold value, the positioning error determining apparatus 132 determines that there is a positioning error in any one of the triangulation coordinate value and the grid cell coordinate value. The positioning error determining apparatus 132 calculates the distance difference value between the triangulation coordinate value and the grid cell coordinate value by using Equation 1.

$$C_i = \sqrt{(x_T - x_P)^2 + (y_T - y_P)^2}$$  Equation 1

In Equation 1, $A_i=(x_t,y_t)$ is a triangular coordinate value, $Bi=(x_p,y_p)$ is a grid cell coordinate value, and $C_i$ is a distance difference value.

The positioning error determining apparatus 132 recognizes the distance difference value as a positioning error.

On the other hand, the positioning error determining apparatus 132 additionally receives BS environment information from the mobile communication terminal 110, checks BS identification information included in the BS environment information, selects a BS grid cell corresponding to the BS identification information, calculates a base station-based triangulation coordinate value by performing triangulation with a coordinate value corresponding to the BS grid cell, compares the base station-based triangulation coordinate value and the grid cell coordinate value, and determines whether there is a positioning error in any one of the base station-based triangulation coordinate value and the grid cell coordinate value. In addition, the positioning error determining apparatus 132 calculates a distance difference value between the base station-based triangulation coordinate value and the grid cell coordinate value, and, if the distance difference value exceeds a threshold value, determines that there is a positioning error in any one of the base station-based triangulation coordinate value and the grid cell coordinate value.

In addition, if distance difference values cumulatively stored in the database 140 exceed a threshold value by a predetermined ratio or more, the positioning error determining apparatus 132 determines that there are positioning errors in the grid cell coordinate value. Specifically, if distance difference values cumulatively stored in the database 140 exceed a threshold value by a predetermined ratio or more, the positioning error determining apparatus 132 determines that there are persistent errors occurred and they were generated when configuring the database 140. Herein, it is assumed that the predetermined ratio is r=0.9. In this case, if one or more cumulatively stored distance difference values exceed a threshold value by 0.9 or more, the positioning error determining apparatus 132 may determine that an error or errors occurred in the grid cell coordinate value, and transmit the relevant data to an operator or a server for error management. Thus, an operator (manager) can detect overall positioning errors though an operator (manager) terminal and remove or interpolate the errors depending on their classified grades.

According to one or more embodiments of the present disclosure, the database 140 stores positioning result data of each positioning as basic data, corresponding to grid cells separated by pCell IDs, as basic data, and also stores WLAN environment information matched to the grid cells. Specifically, the database 140 divides a positioning service target region in units of a grid of a predetermined size, defines each grid as a pCell, and stores the positioning result of each pCell. Herein, the grid cell is obtained by separating a specific region by a predetermined size, and includes a BS sector number of a BS located in a specific region and a PCS based pCell ID. Specifically, the grid cell may be set to a size of N×M. For example, the grid cell may be set to a square shape such as 100×100, 50×50, 30×30, 25×25, 20×20, 10×10, 5×5 or 1×1; however, the present disclosure is not limited thereto. The grid cell may be set to various shapes suitable for respective environments through a future optimization operation. In addition, by default, the database 140 illustrated in FIG. 1 includes information on a serving system, a pilot signal of an adjacent BS, and a signal strength (Ec/Io). Herein, the information on a serving system includes a system ID (SID), a network ID (NID), a base station ID (BSID), a serving BS sector number (reference PN: Ref_PN), a pilot phase in Ref_PN, and a signal strength.

Data of a pCell positioning scheme stored in the database 140 will be described in detail. The database 140 stores positioning result data of each positioning as basic data, corresponding to grid cells separated by each pCell ID, and also stores reference data representing the basic data. Herein, the reference data are compared in considering pattern matching in pCell positioning. The reference data greatly affect positioning accuracy. The reference data are updated when the database is updated. A general database updating scheme updates reference data by arithmetically averaging newly-measured positioning result data and prestored basic data. Due to this data updating scheme, the newly-measured positioning result data may be reflected to an insignificant degree on the updated reference data. In particular, if there are many basic data prestored in the database, even when the database is updated, the newly-measured positioning result data hardly affect the update of reference data.

In order for the positioning scheme to provide more accurate positioning results, the database should be updated to always retain the newest data (e.g., PN, pilot phase, signal strength, or the like). However, due to the characteristics of the above database updating scheme in a general pCell positioning scheme, a general database updating scheme may fail to fully reflect a change in positioning environments such as a wireless environment and a positioning system state. For example, if a positioning system or a wireless environment for providing a positioning service changes continuously and frequently, currently-measured positioning result data may provide more accurate positioning results than reference data prestored in the database can. In this case, when updating reference data prestored in the database, the reference data for storing in the database should adaptively follow a change in a current positioning environment by reflecting currently-measured positioning result data to a higher level.

The WLAN signal stored in the database 140 according to one or more embodiments of the present disclosure will be described in detail. The database 140 stores WLAN environment information matched to grid cells separated by each pCell ID. Herein, the WLAN environment information is information for identification of an AP relaying a WLAN signal, and may be a MAC address of an AP relaying a WLAN signal; however, the present disclosure is not limited thereto. Herein, the MAC address is unique information for identifying the AP, and refers to a basis service set Identifier (BSSID). The MAC address may be allocated 48 bits, and 24 bits among them are used to input information allocated by a manufacturer. A service set identifier (SSID) is also information for identifying the AP, and refers to a value set by a user. In addition, the pCell database 140 according to one or more embodiments of the present disclosure stores a position corresponding to BS identification information. Herein, the BS identification information may be a BS sector number; however, the present disclosure is not limited thereto.

The database means a general data structure implemented in a storage space (hard disk or memory) of a computer system by using a database managing program (DBMS), and refers to a data storage type capable of freely performing data retrieval (extraction), deletion, editing, addition, or the like. The database may be implemented to be suitable for the purpose of one or more embodiments of the present disclosure by using a relational database management system (RDBMS) such as Oracle, Infomix, Sybase, or DB2, an object-oriented database management system (OODBMS) such as Gemston, Orion, or O2, and an XML native database such as Excelon, Tamino, or Sekaiju. The database includes suitable fields or elements for achieving its function.

Although FIG. 1 illustrates that the database 140 is separated from the positioning error determining apparatus 132, the present disclosure is not limited thereto and the database 140 may be included in the positioning error determining apparatus 132.

Figure 2:
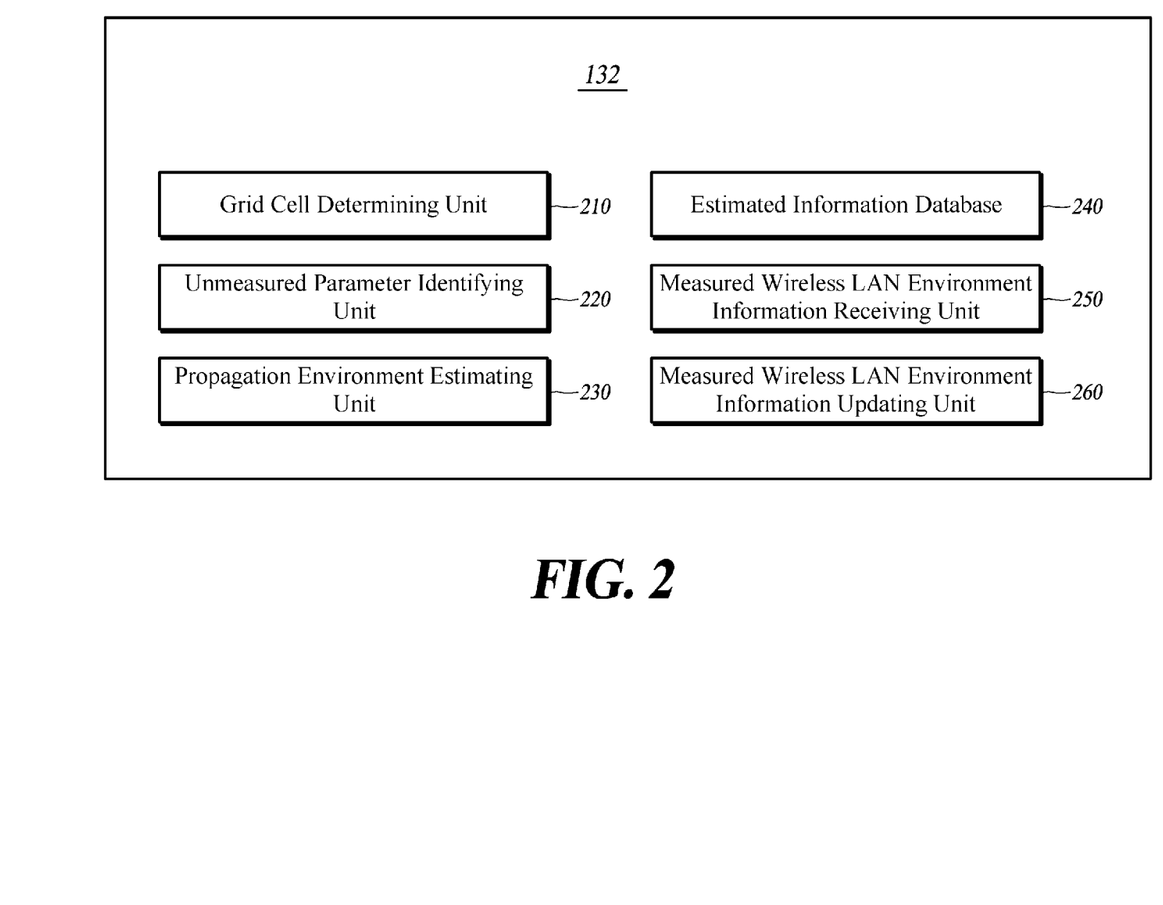
FIG. 2 is a block diagram for schematically illustrating a positioning error determining apparatus according to one or more embodiments of the present disclosure.

FIG. 2 is a block diagram illustrating a positioning error determining apparatus according to one or more embodiments of the present disclosure.

A positioning error determining apparatus 132 according to one or more embodiments of the present disclosure includes an information receiving unit 210, an identification information checking unit 220, a triangulating unit 230, a grid cell positioning unit 240, a distance difference calculating unit 250, and an error determining unit 260. Although the positioning error determining apparatus 132 according to one or more embodiments of the present disclosure specifically lists the components of information receiving unit 210, identification information checking unit 220, triangulating unit 230, grid cell positioning unit 240, distance difference calculating unit 250, and error determining unit 260, the list merely presents the technical idea of one of different exemplary embodiments and those skilled in the art will appreciate that various modifications, additions and substitutions may be made for the components of the positioning error determining apparatus 132 without departing from the essential characteristics of the present disclosure.

The information receiving unit 210 receives terminal WLAN environment information from the mobile communication terminal 110. The information receiving unit 210 additionally receives BS environment information from the mobile communication terminal 110. The information receiving unit 210 checks AP identification information included in the terminal WLAN environment information. The identification information checking unit 220 checks BS identification information included in the BS environment information. The triangulating unit 230 calculates a triangulation coordinate value by performing triangulation with AP position estimation information corresponding to the AP identification information. The triangulating unit 230 selects a BS grid cell corresponding to the BS identification information and calculates a base station-based triangulation coordinate value by performing triangulation with a coordinate value corresponding to the BS grid cell.

The grid cell positioning unit 240 selects one or more grid cells corresponding to the AP identification information and calculates a grid cell coordinate value based on a coordinate value corresponding to the grid cell selected. The grid cell positioning unit 240 calculates the grid cell coordinate value by one or more of a triangulation positioning scheme based on the coordinate value corresponding to the grid cell selected, a median calculation scheme, and an average value calculation scheme based on a signal strength. If the grid cells selected are three or more, the grid cell positioning unit 240 selects three cells having the highest radiowave strength among radiowave strength information included in terminal WLAN environment information, and calculates the grid cell coordinate value by performing triangulation with coordinate values corresponding to the three grid cells. If the grid cells selected are two, the grid cell positioning unit 240 calculates the grid cell coordinate value with a median of coordinate values corresponding to the two grid cells. If there are plural grid cells selected, the grid cell positioning unit 240 selects a grid cell with the highest radiowave strength and a grid cell with the lowest radiowave strength among the radiowave strength information included in the terminal WLAN environment information, and calculates the grid cell coordinate value with a median of a coordinate value corresponding to the grid cell with the highest radiowave strength and a coordinate value corresponding to the grid cell with the lowest radiowave strength.

The distance difference calculating unit 250 calculates a distance difference value between the triangulation coordinate value and the grid cell coordinate value. The distance difference calculating unit 250 calculates the distance difference value between the triangulation coordinate value and the grid cell coordinate value by using Equation 1. The distance difference calculating unit 250 calculates a distance difference value between the base station-based triangulation coordinate value and the grid cell coordinate value.

The error determining unit 260 compares between the triangulation coordinate value and the grid cell coordinate value to determine whether there is a positioning error in any one of the triangulation coordinate value and the grid cell coordinate value. If the distance difference value exceeds a threshold value, the error determining unit 260 determines that there is a positioning error in any one of the triangulation coordinate value and the grid cell coordinate value. The error determining unit 260 recognizes the distance difference value as a positioning error. The error determining unit 260 compares between the base station-based triangulation coordinate value and the grid cell coordinate value to determine whether there is a positioning error in any one of the base station-based triangulation coordinate value and the grid cell coordinate value. If the distance difference value exceeds a threshold value, the error determining unit 260 determines that there is a positioning error in any one of the base station-based triangulation coordinate value and the grid cell coordinate value. If distance difference values cumulatively stored in the database 140 exceed a threshold value by a predetermined ratio or more, the error determining unit 260 determines that there are positioning errors in the grid cell coordinate value.

Figure 3:
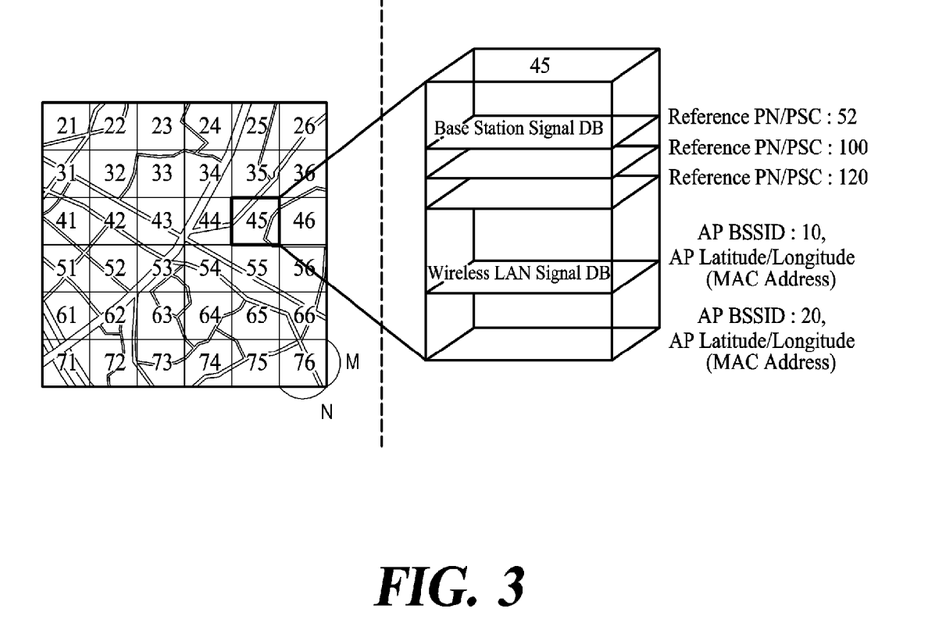
FIG. 3 is a block diagram for illustrating a schematic configuration of a database according to one or more embodiments of the present disclosure.

FIG. 3 is a block diagram illustrating a schematic configuration of a database according to one or more embodiments of the present disclosure.

The database 140 illustrated in FIG. 3 divides a positioning service target region in units of a grid of a predetermined size, defines each grid as a pCell, and stores the positioning result of each pCell. The grid cell illustrated in FIG. 3 is obtained by separating a specific region by a predetermined size, and includes a BS sector number of a BS located in a specific region and a PCS based pCell ID. Specifically, the grid cell may be set to a size of N×M. For example, the grid cell may be set to a square shape such as 100×100, 50×50, 30×30, 25×25, 20×20, 10×10, 5×5 or 1×1; however, the present disclosure is not limited thereto. The grid cell may be set to various shapes suitable for respective environments through a future optimization operation.

By default, the database 140 illustrated in FIG. 3 includes information on a serving system, a pilot signal of an adjacent BS, and signal strength (Ec/Io). The information on a serving system includes a system ID (SID), a network ID (NID), a base station ID (BSID), a serving BS sector number (reference PN: Ref_PN), a pilot phase in Ref_PN, and a signal strength.

In addition, as illustrated in FIG. 3, the database 140 stores identification information on an AP communicating a WLAN signal, MAC address information, received signal strength information, frequency information, and position estimation information on an AP, matched to grid cells separated by each pCell ID. When obtaining one or more of latitude information, longitude information, and altitude information that are accurate installation position information on the AP through an external server, the database 140 may update position estimation information on the AP to the accurate installation position information on the AP.

The pCell-related parameters stored in the database 140 will be described in detail. The pCell-related parameters include one or more of Country Code (MCC), Network Code (MNC), UCID, pCell DB Search Key Value (PSC), the number of PSCs collected (CeIIMRL CNT), CeIIMRL PSC, CeI-IMRL ECNO, CeIIMRL RSCP, CeIIMRL Pathloss, System ID (SID), Network ID (NID), Base Station ID (BASE ID), BS Sector Number (REF PN), REF PN Pilot Strength (REF PN PS), Neighbor Collection Count (Num_p), Total Power of Received Signal (RX TOT PWR), and Standard Deviation of PH Phase (RMS ERROR PHASE). In addition, the parameters of WLAN environment information stored in the database 140 will be described in detail. The parameters of WLAN environment information include one or more of identification information on an AP communicating a WLAN signal (SSID), MAC address information (BSSID), received signal strength information (RSSI), frequency information (channel), and position estimation information on the AP.

The database means a general data structure implemented in a storage space (hard disk or memory) of a computer system by using a database managing program (DBMS), and refers to a data storage type capable of freely performing data retrieval (extraction), deletion, editing, addition, or the like. The database may be implemented to be suitable for the purpose of one or more embodiments of the present disclosure by using a relational database management system (RDBMS) such as Oracle, Infomix, Sybase, or DB2, an object-oriented database management system (OODBMS) such as Gemston, Orion, or O2, and an XML native database such as Excelon, Tamino, or Sekaiju. The database includes suitable fields or elements for achieving its function.

Figure 4:
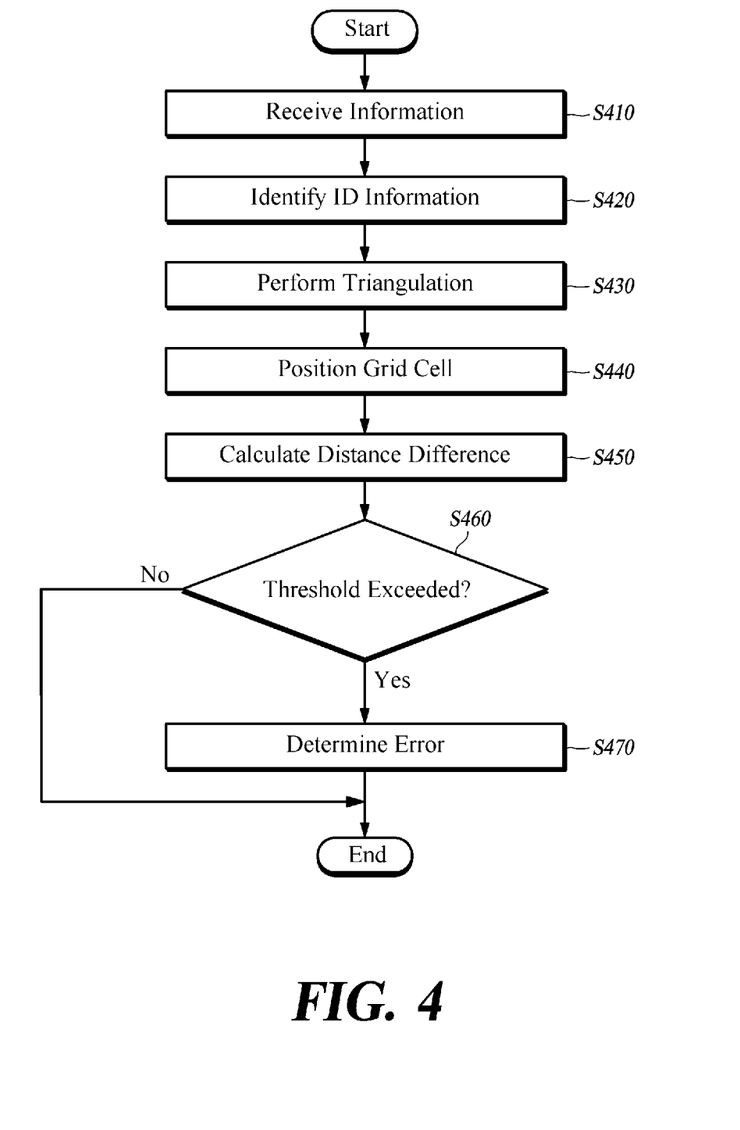
FIG. 4 is a flow chart illustrating a method for determining a positioning error by WLAN environment information according to one or more embodiments of the present disclosure.

FIG. 4 is a flow chart illustrating a method for determining a positioning error by WLAN environment information according to one or more embodiments of the present disclosure.

The positioning error determining apparatus 132 receives terminal WLAN environment information from the mobile communication terminal 110 (step S410). Specifically, the mobile communication terminal 110 transmits terminal WLAN environment information including WLAN environment information received from an adjacent communicating AP, to the positioning error determining apparatus 132. The positioning error determining apparatus 132 checks AP identification information included in the terminal WLAN environment information received from the mobile communication terminal 110 (step S420). Herein, the WLAN environment information includes one or more of a MAC address of an AP for relaying a WLAN signal, received signal strength for each MAC address, AP channel information, and AP frequency information. The AP identification information may be any information for identification of the AP, and may be a MAC address.

The positioning error determining apparatus 132 calculates a triangulation coordinate value by performing triangulation with AP position estimation information corresponding to the AP identification information (step S430). Specifically, if there are plural pieces of AP identification information, the positioning error determining apparatus 132 may select three pieces of the AP position estimation information as having a signal strength of a predetermined value or more, triangulate the selected positions, calculate a center point of the triangle, and recognize the center point as triangulation position information.

The positioning error determining apparatus 132 selects one or more grid cells corresponding to the AP identification information and calculates a grid cell coordinate value based on a coordinate value corresponding to the grid cell selected (step S440). The positioning error determining apparatus 132 calculates the grid cell coordinate value by one or more of a triangulation positioning scheme based on the coordinate value corresponding to the grid cell selected, a median calculation scheme, and an average value calculation scheme based on a signal strength. If the grid cells selected are three or more, the positioning error determining apparatus 132 selects three cells having the highest radiowave strength among radiowave strength information included in terminal WLAN environment information, and calculates the grid cell coordinate value by performing triangulation with coordinate values corresponding to the three grid cells. If the grid cells selected are two, the positioning error determining apparatus 132 calculates the grid cell coordinate value with a median of coordinate values corresponding to the two grid cells. If there are plural grid cells selected, the positioning error determining apparatus 132 selects a grid cell with the highest radiowave strength and a grid cell with the lowest radiowave strength among the radiowave strength information included in the terminal WLAN environment information, and calculates the grid cell coordinate value with a median of a coordinate value corresponding to the grid cell with the highest radiowave strength and a coordinate value corresponding to the grid cell with the lowest radiowave strength.

The positioning error determining apparatus 132 calculates a distance difference value between the triangulation coordinate value and the grid cell coordinate value (step S450). The positioning error determining apparatus 132 determines whether the distance difference value between the triangulation coordinate value and the grid cell coordinate value exceeds a threshold value (step S460). When step S460 determines that the distance difference value between the triangulation coordinate value and the grid cell coordinate value exceeds the threshold value, the positioning error determining apparatus 132 determines that there is an error in any one of the triangulation coordinate value and the grid cell coordinate value (S470). The positioning error determining apparatus 132 calculates the distance difference value between the triangulation coordinate value and the grid cell coordinate value by using Equation 1. The positioning error determining apparatus 132 recognizes the distance difference value as a positioning error. In addition, if distance difference values cumulatively stored in the database 140 exceed a threshold value by a predetermined ratio or more, the positioning error determining apparatus 132 determines that there are positioning errors in the grid cell coordinate value. Specifically, if distance difference values cumulatively stored in the database 140 exceed a threshold value by a predetermined ratio or more, the positioning error determining apparatus 132 determines that errors occur continuously and they occurred in configuring the database 140.

Although FIG. 4 illustrates that steps S410 to S470 are performed sequentially, this merely presents the technical idea of one of different exemplary embodiments and those skilled in the art will appreciate that modifications may be made therein without departing from the essential characteristics of the present disclosure. For example, the order of steps in FIG. 4 may be changed, or one or more of steps S410 to 470 may be performed in parallel rather than a sequential limitation.

The positioning error determining method using WLAN environment information according to one or more embodiments of the embodiment of the present disclosure illustrated in FIG. 4 may be implemented in a program and may be written on a computer-readable recording medium. The computer-readable recording medium recording a program for implementing the positioning error determining method using WLAN environment information according to one or more embodiments of the present disclosure may be any data storage device that can store data which can be thereafter read by a computer system. Examples of the computer-readable recording medium may include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code may be stored and executed in a distributed fashion. In addition, functional programs, codes, and code segments for accomplishing the present invention can be easily construed by programmers skilled in the art to which the embodiment of the present disclosure pertains.

Figure 5:
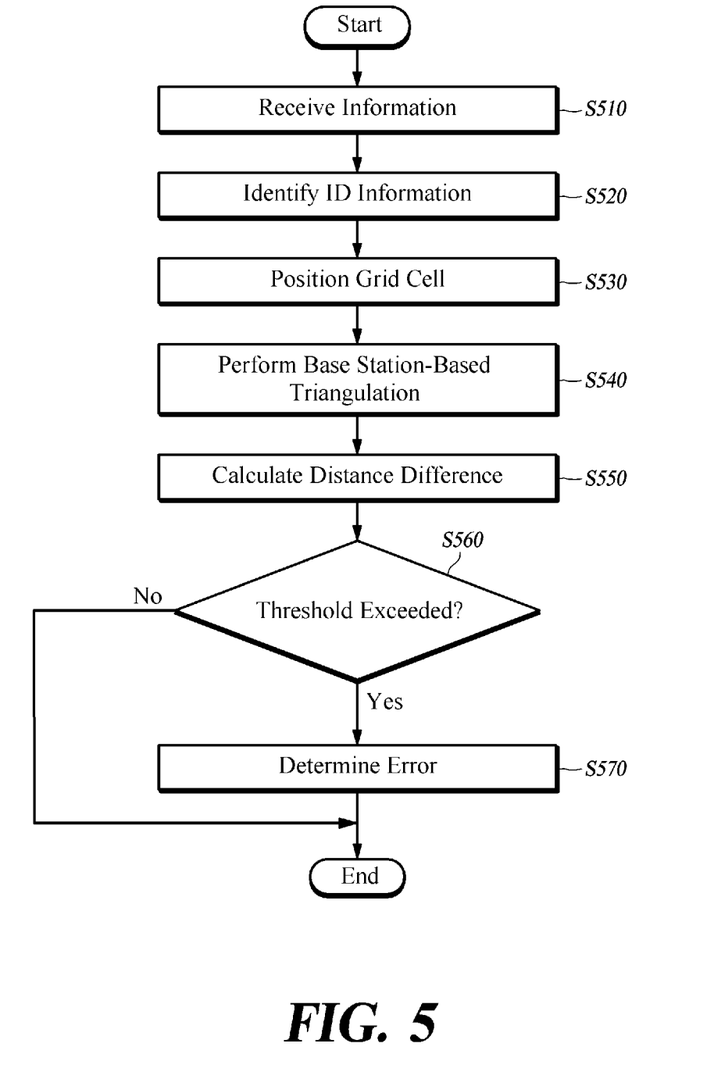
FIG. 5 is a flow chart illustrating a method for determining a positioning error by WLAN environment information and base station environment information according to one or more embodiments of the present disclosure.

FIG. 5 is a flow chart illustrating a method for determining a positioning error by WLAN environment information and BS environment information according to one or more embodiments of the present disclosure.

The positioning error determining apparatus 132 receives terminal WLAN environment information and BS environment information from the mobile communication terminal 110 (S510). Specifically, the mobile communication terminal 110 transmits terminal WLAN environment information including WLAN environment information received from an adjacent communicating AP, to the positioning error determining apparatus 132, and transmits BS environment information received from an adjacent communicating BS, to the positioning error determining apparatus 132.

The positioning error determining apparatus 132 checks AP identification information included in the terminal WLAN environment information received from the mobile communication terminal 110, and checks BS identification information included in the BS environment information (step S520). Herein, the WLAN environment information includes one or more of a MAC address of an AP relaying a WLAN signal, a received signal strength for each MAC address, AP channel information, and AP frequency information. The AP identification information may be any information for identification of the AP, and may be a MAC address. Herein, the BS environment information includes a system ID, a network ID, a base station ID, a serving BS sector number, a pilot phase in Ref_PN, and a signal strength. The BS identification information may be any information for identification of the BS, and may be a BS sector number.

The positioning error determining apparatus 132 selects one or more grid cells corresponding to the AP identification information and calculates a grid cell coordinate value based on a coordinate value corresponding to the grid cell selected (step S530). The positioning error determining apparatus 132 calculates the grid cell coordinate value by one or more of a triangulation positioning scheme based on the coordinate value corresponding to the grid cell selected, a median calculation scheme, and an average value calculation scheme based on a signal strength. If the grid cells selected are three or more, the positioning error determining apparatus 132 selects three cells having the highest radiowave strength among radiowave strength information included in terminal WLAN environment information, and calculates the grid cell coordinate value by performing triangulation with coordinate values corresponding to the three grid cells. If the grid cells selected are two, the positioning error determining apparatus 132 calculates the grid cell coordinate value with a median of coordinate values corresponding to the two grid cells. If the grid cells selected are plural, the positioning error determining apparatus 132 selects a grid cell with the highest radiowave strength and a grid cell with the lowest radiowave strength among the radiowave strength information included in the terminal WLAN environment information, and calculates the grid cell coordinate value with a median of a coordinate value corresponding to the grid cell with the highest radiowave strength and a coordinate value corresponding to the grid cell with the lowest radiowave strength.

The positioning error determining apparatus 132 selects a BS grid cell corresponding to the BS identification information and calculates a base station-based triangulation coordinate value by performing triangulation with a coordinate value corresponding to the BS grid cell (step S540). Specifically, if there are a plurality of BS grid cells corresponding to the BS identification information, the positioning error determining apparatus 132 may select three coordinates values corresponding to the BS grid cell with a signal strength of a predetermined value or more among a plurality of BS identification information elements, triangulate the selected points, calculate a center point of the triangle, and recognize the center point as triangulation position information.

The positioning error determining apparatus 132 calculates a distance difference value between the base station-based triangulation coordinate value and the grid cell coordinate value (step S550). The positioning error determining apparatus 132 determines whether the distance difference value between the base station-based triangulation coordinate value and the grid cell coordinate value exceeds a threshold value (step S560). When determining in step S560 that the distance difference value between the base station-based triangulation coordinate value and the grid cell coordinate value exceeds the threshold value, the positioning error determining apparatus 132 determines that there is an error in any one of the base station-based triangulation coordinate value and the grid cell coordinate value (S570). The positioning error determining apparatus 132 recognizes the distance difference value as a positioning error.

Although FIG. 5 illustrates that steps S510 to S570 are performed sequentially, this should be considered in descriptive sense only and not for the purposes of limitation and those skilled in the art will appreciate that modifications may be made therein without departing from the essential characteristics of the present disclosure. For example, the order of steps in FIG. 5 may be changed, or one or more of steps S510 to 570 may be performed in parallel.

The positioning error determining method using WLAN environment information and BS environment information according to one or more embodiments of the present disclosure illustrated in FIG. 5 may be implemented in a program and may be written on a computer-readable recording medium. The computer-readable recording medium recording a program for implementing the positioning error determining method using WLAN environment information and BS environment information according to one or more embodiments of the present disclosure may be any data storage device that can store data which can be thereafter read by a computer system. Examples of the computer-readable recording medium may include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code may be stored and executed in a distributed fashion. In addition, functional programs, codes, and code segments for accomplishing the present invention can be easily construed by programmers skilled in the art to which the embodiment of the present disclosure pertains.

Figure 6:
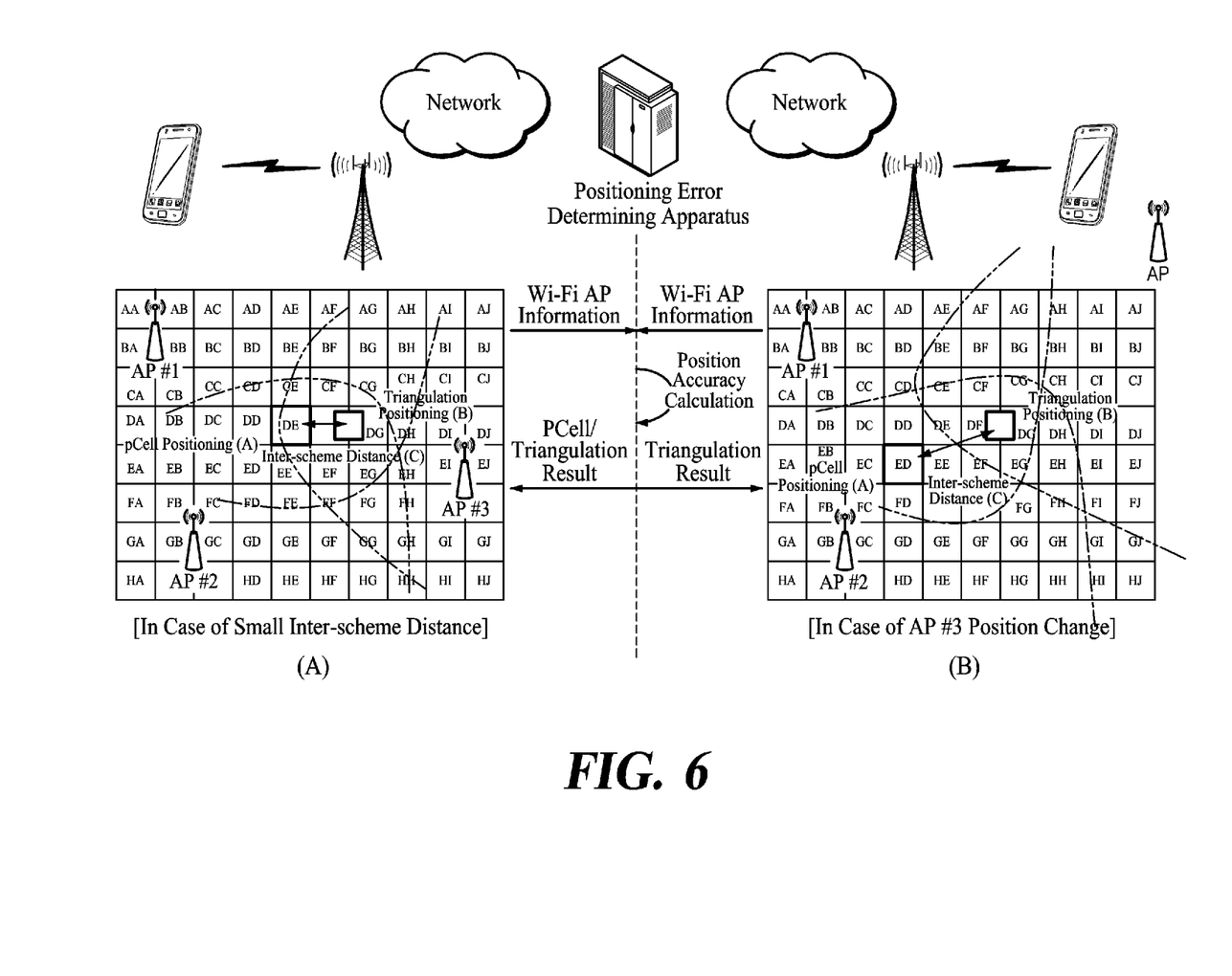
FIG. 6 is a diagram illustrating an example of positioning error determination according to one or more embodiments of the present disclosure.

FIG. 6 is a diagram illustrating an example of positioning error determination according to one or more embodiments of the present disclosure.

The positioning error determining apparatus 132 receives terminal WLAN environment information from the mobile communication terminal 110. The positioning error determining apparatus 132 checks AP identification information included in the terminal WLAN environment information received from the mobile communication terminal 110. The positioning error determining apparatus 132 calculates a triangulation coordinate value by performing triangulation with AP position estimation information corresponding to the AP identification information. The positioning error determining apparatus 132 selects one or more grid cells corresponding to the AP identification information and calculates a grid cell coordinate value based on a coordinate value corresponding to the grid cell selected. The positioning error determining apparatus 132 calculates a distance difference value between the triangulation coordinate value and the grid cell coordinate value. The positioning error determining apparatus 132 determines whether the distance difference value exceeds a threshold value.

As illustrated in FIG. 6A, if it is determined that the distance difference value between the triangulation coordinate value and the grid cell coordinate value does not exceed the threshold value, the positioning error determining apparatus 132 determines that the distance difference value between the triangulation coordinate value and the grid cell coordinate value is within an allowable-error range. On the other hand, as illustrated in FIG. 6B, if it is determined that the distance difference value between the triangulation coordinate value and the grid cell coordinate value exceeds the threshold value, the positioning error determining apparatus 132 determines that there is a positioning error in any one of the triangulation coordinate value and the grid cell coordinate value. Herein, the positioning error determining apparatus 132 recognizes the distance difference value as a positioning error.

On the other hand, the positioning error determining apparatus 132 additionally receives BS environment information from the mobile communication terminal 110, checks BS identification information included in the BS environment information, selects a BS grid cell corresponding to the BS identification information, calculates a base station-based triangulation coordinate value by performing triangulation with a coordinate value corresponding to the BS grid cell, calculates a distance difference value between the base station-based triangulation coordinate value and the grid cell coordinate value, and determines whether the distance difference value between the base station-based triangulation coordinate value and the grid cell coordinate value exceeds a threshold value.

As illustrated in FIG. 6A, if it is determined that the distance difference value between the base station-based triangulation coordinate value and the grid cell coordinate value does not exceed the threshold value, the positioning error determining apparatus 132 determines that the distance difference value between the base station-based triangulation coordinate value and the grid cell coordinate value is within an allowable-error range. On the other hand, as illustrated in FIG. 6B, if it is determined that the distance difference value between the base station-based triangulation coordinate value and the grid cell coordinate value exceeds the threshold value, the positioning error determining apparatus 132 determines that there is a positioning error in any one of the base station-based triangulation coordinate value and the grid cell coordinate value. Herein, the positioning error determining apparatus 132 recognizes the distance difference value as a positioning error.

In the description above, although all of the components of one or more embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is applicable in various fields of determining a positioning error, and is useful for improving a positioning accuracy and a customer satisfaction by comparison between a triangulation scheme and a pCell scheme.

CROSS-REFERENCE TO RELATED APPLICATION

If applicable, this application claims priority under 35 U.S.C §119(a) of Patent Application No. 10-2010-0065807, filed on Jul. 8, 2010 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. An apparatus for determining a positioning error, comprising:
a database for storing grid cells separated by each pilot cell identifier (pCell ID) and wireless local area network (LAN) environment information matched to the grid cells;
an information receiving unit for receiving terminal WLAN environment information from a mobile communication terminal;
an identification information checking unit for checking access point (AP) identification information included in the terminal WLAN environment information;
a triangulating unit for calculating a triangulation coordinate value by performing triangulation with AP position estimation information corresponding to the AP identification information;
a grid cell positioning unit for selecting one or more grid cells corresponding to the AP identification information and calculating a grid cell coordinate value based on a coordinate value corresponding to the grid cell selected; and
an error determining unit for comparing the triangulation coordinate value and the grid cell coordinate value and determining whether there is a positioning error in any one of the triangulation coordinate value and the grid cell coordinate value.

2. The apparatus of claim 1, further comprising a distance difference calculating unit for calculating a distance difference value between the triangulation coordinate value and the grid cell coordinate value,
wherein, the error determining unit determines that there is a positioning error in any one of the triangulation coordinate value and the grid cell coordinate value, if the distance difference value exceeds a threshold value.

3. The apparatus of claim 2, wherein the distance difference calculating unit calculates the distance difference value between the triangulation coordinate value and the grid cell coordinate value by using an equation $C_i = \sqrt{(x_T - x_P)^2 + (y_T - y_P)^2}$ where $A_i = (x_t, y_t)$ is a triangular coordinate value, $Bi = (x_p, y_p)$ is a grid cell coordinate value, and $C_i$ is a distance difference.

4. The apparatus of claim 2, wherein the error determining unit recognizes the distance difference value as the positioning error.

5. The apparatus of claim 2, wherein
the information receiving unit additionally receives base station environment information from the mobile communication terminal,
the identification information checking unit checks base station identification information included in the base station environment information,
the triangulating unit selects a base station grid cell corresponding to the base station identification information and calculates a base station-based triangulation coordinate value by performing triangulation with a coordinate value corresponding to the base station grid cell, and
the error determining unit compares the base station-based triangulation coordinate value and the grid cell coordinate value and determining whether there is a positioning error in any one of the base station-based triangulation coordinate value and the grid cell coordinate value.

6. The apparatus of claim 5, wherein
the distance difference calculating unit calculates a distance difference value between the base station-based triangulation coordinate value and the grid cell coordinate value, and
the error determining unit determines that there is a positioning error in any one of the base station-based triangulation coordinate value and the grid cell coordinate value, if the distance difference value exceeds a threshold value.

7. The apparatus of claim 1, wherein the grid cell positioning unit calculates the grid cell coordinate value by one or more of a triangulation positioning scheme based on the coordinate value corresponding to the grid cell selected, a median calculation scheme, and an average value calculation scheme based on a signal strength.

8. The apparatus of claim 1, wherein, if the grid cells selected are three or more, the grid cell positioning unit selects three cells having the highest radiowave strength among radiowave strength information included in the terminal WLAN environment information, and calculates the grid cell coordinate value by performing triangulation with coordinate values corresponding to the three grid cells.

9. The apparatus of claim 1, wherein, if the grid cells selected are two, the grid cell positioning unit calculates the grid cell coordinate value with a median of coordinate values corresponding to the two grid cells.

10. The apparatus of claim 1, wherein, if a distance difference value cumulatively stored in the database exceeds a threshold value by a predetermined ratio or more, the error determining unit determines that there is a positioning error in the grid cell coordinate value.

11. An apparatus for determining a positioning error, comprising:
a database for storing grid cells separated by each pilot cell identifier (pCell ID) and wireless local area network (LAN) environment information matched to the grid cells;
an information receiving unit for receiving terminal WLAN environment information and base station environment information from a mobile communication terminal;
an identification information checking unit for checking access point (AP) identification information included in the terminal WLAN environment information and base station identification information included in the base station environment information;
a grid cell positioning unit for selecting a grid cell corresponding to the AP identification information and calculating a grid cell coordinate value based on a coordinate value corresponding to the grid cell selected;
a triangulating unit for selecting a base station grid cell corresponding to the base station identification information and calculating a base station-based triangulation coordinate value by performing triangulation a coordinate value corresponding to the base station grid cell; and
an error determining unit for comparing the base station-based triangulation coordinate value and the grid cell coordinate value and determining whether there is a positioning error in any one of the base station-based triangulation coordinate value and the grid cell coordinate value.

12. A method for determining a positioning error, comprising:
receiving terminal wireless local area network (LAN) environment information from a mobile communication terminal;

checking access point (AP) identification information included in the terminal WLAN environment information;

calculating a triangulation coordinate value by performing triangulation with AP position estimation information corresponding to the AP identification information;

selecting one or more grid cells corresponding to the AP identification information and calculating a grid cell coordinate value based on a coordinate value corresponding to the grid cell selected; and comparing the triangulation coordinate value and the grid cell coordinate value and determining whether there is a positioning error in any one of the triangulation coordinate value and the grid cell coordinate value.

13. The method of claim 12, wherein the step of determining a positioning error comprises:

calculating a distance difference value between the triangulation coordinate value and the grid cell coordinate value; and determining that there is a positioning error in any one of the triangulation coordinate value and the grid cell coordinate value, if the distance difference value exceeds a threshold value.

14. The method of claim 13, wherein the process of distance difference calculating calculates the distance difference value between the triangulation coordinate value and the grid cell coordinate value by using an equation $C_i = \sqrt{(x_T-x_P)^2+(y_T-y_P)^2}$ where $A_i=(x_t,y_t)$ is a triangular coordinate value, $B_i=(x_p,y_p)$ is a grid cell coordinate value, and $C_i$ is a distance difference.

15. A method for determining a positioning error, comprising:

receiving terminal wireless local area network (LAN) environment information and base station environment information from a mobile communication terminal;

checking access point (AP) identification information included in the terminal WLAN environment information and base station identification information included in the base station environment information;

selecting a grid cell corresponding to the AP identification information and calculating a grid cell coordinate value based on a coordinate value corresponding to the grid cell selected;

selecting a base station grid cell corresponding to the base station identification information and calculating a base station-based triangulation coordinate value by performing triangulation a coordinate value corresponding to the base station grid cell; and comparing the base station-based triangulation coordinate value and the grid cell coordinate value and determining whether there is a positioning error in any one of the base station-based triangulation coordinate value and the grid cell coordinate value.

16. The method of claim 15, wherein the step of determining a positioning error comprises:

calculating a distance difference value between the base station-based triangulation coordinate value and the grid cell coordinate value; and determining that there is a positioning error in any one of the base station-based triangulation coordinate value and the grid cell coordinate value, if the distance difference value exceeds a threshold value.

* * * * *